Sept. 23, 1941.      H. H. CARY ET AL      2,256,733
ELECTRODE FOR THE ELECTRICAL DETERMINATION OF PH
Filed Sept. 20, 1937

Inventors
Henry H. Cary
Warren P. Baxter
By Lyon & Lyon
Attorneys

Patented Sept. 23, 1941

2,256,733

UNITED STATES PATENT OFFICE 2,256,733

ELECTRODE FOR THE ELECTRICAL DETERMINATION OF PH

Henry H. Cary, Santa Monica, and Warren P. Baxter, Pasadena, Calif., assignors to National Technical Laboratories, Pasadena, Calif., a corporation of California Application September 20, 1937, Serial No. 164,696

9 Claims. (Cl. 204—195)

The present invention relates to an electrode for the electrical determination of pH.

An object of the present invention is to provide an electrode which contains an electrolyte permanently sealed in place and which electrode may be used without the necessity of replacing the electrolyte.

Another object of the invention is to provide an electrode which is sufficiently rugged in construction so that it may be used without danger of fracture.

Another object of the present invention is to provide an electrode which is constructed so as to eliminate leakage currents which interfere with the accuracy of the pH determinations.

A further object of the present invention is to provide an electrode which may be handled in the open without errors being introduced through electrostatic voltages.

The present invention preferably employs the Haber type of glass electrode. The Haber type glass electrode consists of a bulb of glass blown on the end of a supporting tube. Connection is made with the inner surface of the bulb by means of a suitable electrolyte and an internal metallic electrode, although the electrolyte may be omitted and connection made by a metallic coating, such as mercury. The electrode is supported in position in some convenient manner and the conductor extending from the metallic electrode is usually supported by one or more insulators. When such an electrode is dipped into a solution, the potential difference set up in the glass membrane depends on the pH of the external solution. If some suitable reference electrode is dipped into the external solution so that the membrane potential may be measured, the complete cell permits the pH of the external solution to be determined electrically.

Heretofore, in the practical use of this electrode measurements have been complicated by the very high resistance of the glass of the bulb to the passage of current. Efforts have been made to reduce the resistance of the electrode by making a very thin walled bulb of large surface area, but the result has been to produce an electrode so fragile that it will not stand the shocks of ordinary handling. When the electrode is constructed with a small solution holding bulb of sufficient rigidity for practical use, the resistance of the glass membrane is commonly of 100 megohms, and in certain cases may be as high as 500 to 1,000 megohms. The use of a bulb having a high resistance materially increases several sources of possible error in determining the pH until they are in significant proportions.

One source of error arises from leakage of electrical currents by conduction along moisture films condensed on the surface of the tube of the electrode. This leakage is particularly pronounced where high humidities are prevalent, so that large amounts of moisture are adsorbed on the surface of the electrode. One means of eliminating this leakage current, in accordance with the present invention, comprises the use of a guard ring. In order to reduce the leakage current, the electrode may be supported on a conducting shield that may be electrically connected to the measuring circuit in such a way that the shield or guard ring has the same potential as the conductor to the electrode at the time the electrode E. M. F. is determined. Theoretically, this reduces the potential difference across the insulating portions of the electrode to zero and consequently reduces the error due to leakage currents around such insulating portion of the electrode likewise to zero. Actually, this is seldom the case. Leakage currents may flow through the insulating portion of the electrode even though no potential difference exists across it. These leakage currents may arise as the result of potential generated by the insulating portion of the electrode itself presumably by an electrolytic action. Because of this effect, the guard ring of the present electrode is not in itself relied upon to entirely eliminate leakage currents.

Surface leakage around the insulating portion of the electrode is, in accordance with the principles of the present invention, materially reduced by confining the electrode solution to a small portion of the lower end of the electrode body and filling the remaining portions of the electrode body with an insulating composition, such as wax. The wax filling inhibits the coating of the interior of the electrode surface with solution or moisture and thus materially avoids leakage currents. The outer surface of the electrode body may also be coated with a composition such as wax adapted to prevent condensation of moisture thereon. By these means, leakage currents due to surface conduction around the outside of the electrode body tube may be substantially eliminated.

As a further means to increase the resistance of this leakage path, the electrode of the present invention is provided with a highly insulated cable extending through the electrode tube body to the electrode contacting the electrolyte. This cable is further provided with a metallic shield which extends substantially to the surface of the electrolyte and operates as a guard ring to reduce the potential across the insulating portion of the electrode to zero. The shielding of the cable also operates to shield the electrode from electrostatic fields so that it may be used in the open.

When using an electrode having the high internal resistance of the electrode of the present invention, the glass electrode and its lead act as a fairly efficient antenna and may pick up transient voltages from the operator or from nearby equipment. These voltages appear in the measuring instrument as fluctuations in the electrode voltage and may lead to considerable error in the pH determinations. For this reason, glass electrodes having a high internal resistance have been usually operated within metallic shields. The effects of these electrostatic voltages are entirely eliminated in the electrode of the present invention by extending the shield of the lead cable into the electrode so that in operation the entire electrode is shielded down to the point where the electrode is immersed in the external solution. The portion of the electrode that is immersed in the external solution is effectively shielded by the solution itself.

The electrode of the present invention preferably employs a shielded lead cable in which the shield is firmly embedded in insulation, generally rubber insulation, in such a manner as to avoid relative motion between the shielding braid and insulation. Unless this precaution is utilized in constructing the electrode of the present invention, electrostatic charges may be generated in the use of the electrode by relative motion between the shielding braid and rubber insulation.

The quinhydrone solutions which are generally used in glass electrodes are unstable and require frequent replacement, so that they are not adapted for use in a glass electrode in which the solution is to be permanently sealed in place. The electrolyte of the present invention is so composed as to be stable. Moreover, the electrolyte used is so composed that with the internal metallic electrode it possesses electric characteristics similar to those possessed by the common quinhydrone-platinum assemblies. By this means, the glass electrodes of the present invention are made replaceable with the glass electrodes in instruments now on the market.

Various further objects and advantages of the electrode of the present invention will be apparent from a description of a preferred form or example of electrode embodying the invention. For this purpose, reference is made to the accompanying drawing which illustrates a preferred form or example of the electrode.

Figure 1:
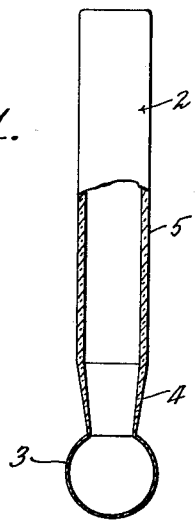
Figure 1 is an elevation in section of the electrode body or tube.
Figure 2:
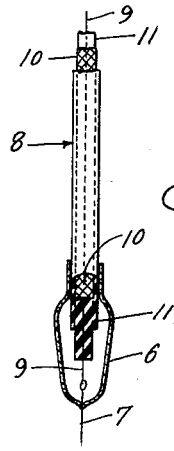
Figure 2 is an elevation, partially in section, of the electrode wire plug used to terminate the lead cable.
Figure 3:
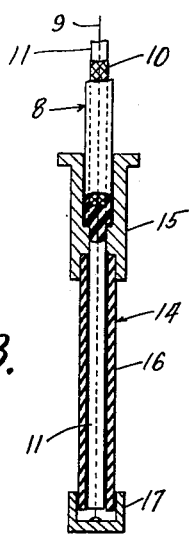
Figure 3 is an elevation, partially in section, of the terminal plug of a lead cable.
Figure 4:
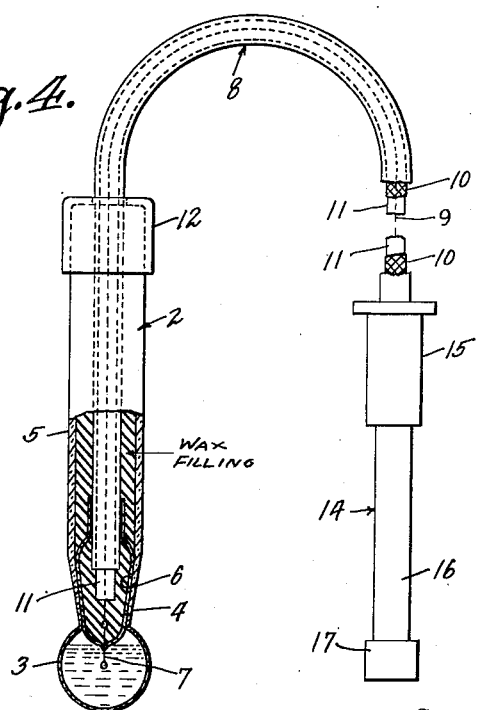
Figure 4 is an assembly of the complete electrode.

Referring to the drawing, the electrode of the present invention is preferably composed of a glass body tube 2 having a small bulb portion 3 at its lower end for holding the electrolyte. Above the bulb portion 3 of the body tube a ground joint portion 4 is provided and thereabove a tubular insulating extension 5. The portions 4 and 5 of the supporting tube should be made of glass of sufficient thickness so as to provide a high resistance to the passage of leakage currents through the insulating portion of the electrode. The tubular extension 5 of the electrode should be sufficiently large compared with the bulb 3 as to provide insulation against surface leakages around the tube 5. The bulb 3 of the electrode is generally of different composition of glass than the body. The bulb 3 should be formed of a glass capable of responding to changes in hydrogen ion concentration in a manner similar to that of a hydrogen electrode. The bulb should be of sufficient thickness so that it will not readily fracture in use and may possess a resistance of 100 megohms, or in other cases 500 or 1,000 megohms.

The electrode also comprises a plug 6 which has a ground fit with the ground portion 4 of the electrode body, the plug serving to hold the internal electrode wire 7 at its lower end, which in one form of the invention constitutes an amalgamated platinum wire. The plug also serves the function of inhibiting contamination of the electrode solution by the coating composition used within the electrode tube. The plug also serves to receive the end of a lead cable 8 which includes a suitable lead wire 9 welded to the platinum electrode wire 7. The lead cable should contain an insulating material of high insulating properties, for example, rubber insulation 11 having a resistance of over 10,000,000 megohms per foot. As shown in the drawing, this insulation is continuous so that the wire 9 is not exposed to the atmosphere. The lead cable is provided with a shielding 10, which in the preferred form of the invention is the braid type of shielding which should be firmly embedded in the rubber insulation 11 in such a manner that the normal flexing of the cable which may occur in operation of electrodes will not produce electrostatic voltages from relative motion between the shielding and insulation. The shielding is terminated within the plug 6 so that it extends in the electrode through the major portion of the tube body of the electrode and sufficiently close to the electrolyte holding bulb 3 thereof that in normal operation of the electrode the solution to be tested will extend to or substantially to the level of the shielding.

In order to inhibit leakage currents around the tube 5 due to surface conduction, the space between the tube 5 and the lead cable, together with the interior of the plug 6, is filled with a suitable material, such as wax, adapted to inhibit the condensation of solution on the inner surface of the tube 5 or plug 6. As shown in the drawing this filling constitutes a moisture impervious seal between the tube 5 and the insulation 11 on the cable 8. A similar coating of wax or other suitable material may be used on the exterior surface of the tube 5, if desired.

At the top of the body there is shown a Bakelite cap 12 for closing the upper end of the body. The other end of the lead cable is shown as preferably connected to the terminal plug 14 of special design to facilitate easy connection between the electrode and the measuring instrument. The terminal plug comprises a metallic bushing 15 to which the shielding 10 of the cable is soldered and from which the connections to the shield in the instrument may be made. Below the bushing 15 there is provided a Pyrex insulating tube 16, through which extends the lead 9 of the cable and a portion of the rubber insulation, the lead 9 at the lower end of the Pyrex insulator 16 being soldered to a cap 17 which may serve as a contact for the instrument in making connection with the electrode wire.

The electrolyte employed within the bulb portion 3 of the electrode must be composed so that it is stable in operation and, moreover, in connection with the internal metallic electrode, has characteristics readily reproducible in constructing like electrodes. There are several electrode assemblies which may be used in the sealed glass electrode of the present invention and have the desired properties of permanence and reproducibility. For example, a silver-silver chloride electrode in 0.1 N HCl may be used. However, such an electrode assembly has a different voltage and change in voltage with temperature from the common quinhydrone electrode assembly referred to and consequently can not be used interchangeably in instruments now in the field. The present electrode assembly is designed to have nearly the same voltage and change in voltage with temperature as the mentioned common electrode assembly. Thus, the assembly of the present invention has a temperature coefficient of about a quarter of a millivolt per degree centigrade when measured against an external quinhydrone electrode. It is found that by using an electrode assembly consisting of an amalgamated platinum wire dipping into a solution containing approximately 0.002 M mercurous ion and approximately one normal H+ ion a stable electrode assembly is provided which may be adjusted to have a temperature coefficient and potential approximately the same as the common quinhydrone electrode.

In constructing the electrode assembly, a platinum wire is sealed through the electrode plug 6 by fusing in the glass and the wire is then amalgamated by placing it in boiling mercury. The electrolyte is then placed in the bulb 3, the electrode plug 6 is firmly seated and is sealed in place by means of a suitable material, such as wax. The electrolyte is approximately 1 N perchloric acid and approximately 0.002 molal mercurous perchlorate. The concentration of the perchloric acid and mercurous perchlorate is then adjusted until it is found that the electrode assembly has zero potential when measured against an external quinhydrone—HCl electrode. There is a variety of strengths of perchloric acid and mercurous perchlorate which will yield the desired potential. However, a concentration of over 1 N perchloric acid is generally to be avoided, as it has the effect of introducing errors in the operation of the glass membrane. Lower concentrations of the perchloric acid require the use of lower concentrations of the mercurous perchlorate in order to secure the desired potential. Since the amount of mercurous perchlorate which will produce the desired potential is in any case small, it is usually desirable to use a concentration of close to 1 N perchloric acid and adjust the concentration in the mercurous perchlorate until the desired potential is secured. Obviously, any compounds which yield the mercurous ion and hydrogen ion may be substituted for the perchloric acid and mercurous perchlorate,—for example, nitric acid and mercurous nitrate. After this assembly has been adjusted as mentioned, it will be found to have substantially the same voltage and temperature coefficient as the quinhydrone platinum assembly which it is intended to replace.

Where the electrode of the present invention is to be used only in new meters, it may be desirable to construct the electrode assembly in such manner that it has zero EMF and approximately zero temperature coefficient when operated in an external solution of a pH of 6.0 and measured against a saturated calomel cell. In this way the temperature effects are negligible, except when using the assembly at the more extreme acid or alkaline ranges, and where temperature compensation is to be built into the instrument it may be more easily done. An electrode assembly which most nearly approaches the conditions mentioned is composed as follows:

The internal metallic electrode may be of silver wire having silver chloride coating thereon or a silver coated platinum wire with a silver chloride coating thereon. The electrolyte to be used therewith consists of a buffer solution having the pH of 5.3 and containing approximately 0.1 N chloride ion. This electrolyte should be adjusted to the desired zero potential when tested in an external solution of 6 pH against a saturated calomel cell, at which time it will likewise have substantially zero temperature coefficient. If it is desired to locate the point of zero voltage and zero temperature coefficient at some pH other than 6, this may be accomplished by adjusting the chloride ion concentration and the pH of the buffer solution.

While the particular electrode herein described is well adapted to carry out the objects of the present invention, it is to be understood that various modifications and changes may be made all coming within the scope of the appended claims.

We claim:

1. A device for the electrical determination of pH, comprising a glass electrode having a hydrogen ion responsive membrane and an insulating glass tubular extension therefrom, a plug having a ground fit with said glass electrode at the junction between the hydrogen ion responsive membrane and said tubular extension and sealing the lower end of the tubular extension, an insulated electrostatically shielded lead wire passing through the extension of said glass electrode and terminated by said plug, the shield of said cable terminating in said plug and the lead wire of said cable being connected to a wire extending into said hydrogen ion sensitive membrane, and a moisture impervious insulating material within said plug.

2. A device for the electrical determination of pH, comprising a glass electrode having a hydrogen ion responsive membrane and an insulating glass tubular extension therefrom, a plug having a ground fit with said glass electrode at the junction between the hydrogen ion responsive membrane and said tubular extension, and sealing the lower end of the tubular extension, an insulated electrostatically shielded lead wire passing through the extension of said glass electrode and terminated by said plug, the shield of said cable terminating in said plug and the lead wire of said cable being connected to a wire extending into said hydrogen ion sensitive membrane, a moisture impervious insulating material within said plug, and a moisture impervious insulating material occupying the space between said extension of said glass electrode and said insulating electrostatically shielded lead wire.

3. In a device for the electrical determination of pH, a glass electrode having a hydrogen ion responsive membrane and a hollow insulating extension therefrom, a lead wire electrically connected to said hydrogen ion responsive membrane through said extension, said wire being provided with continuous electrical insulation extending to a point a substantial distance from the end of said hollow extension remote from said membrane, and a moisture impervious insulating material forming a moisture impervious and leakage current inhibiting seal between the extension of said electrode and said continuous insulation.

4. In a device for the electrical determination of pH, a glass electrode having a hydrogen ion responsive membrane, a hollow insulating extension therefrom, a highly insulated cable having a conductor electrically connected to said hydrogen ion responsive membrane through said extension and provided with an electrostatic shield insulated from said conductor, said cable including said shield extending from a point within said extension adjacent said membrane to a point a substantial distance from the end of said extension remote from said membrane.

5. In a device for the electrical determination of pH, a glass electrode having a hydrogen ion responsive membrane and a hollow insulating extension therefrom, a lead wire electrically connected to said hydrogen ion responsive membrane through said extension, said wire being provided with continuous electrical insulation extending from a point adjacent the membrane to a point a substantial distance from the end of said hollow extension remote from said membrane, and a moisture impervious insulating material forming a moisture impervious and leakage current inhibiting seal between the extension of said electrode and said continuous insulation.

6. In a device for the electrical determination of pH, a glass electrode having a hydrogen ion responsive membrane, a hollow insulating extension therefrom, a highly insulated cable having a conductor electrically connected to said hydrogen ion responsive membrane through said extension and provided with an electrostatic shield insulated from said conductor, said cable including said shield extending from a point within said extension adjacent said membrane to a point at a substantial distance from the end of said extension remote from said membrane, and a moisture impervious insulating material forming a moisture impervious and leakage current inhibiting seal between the extension of said electrode and the insulation of said cable.

7. In a device for the electrical determination of pH, a glass electrode having a hydrogen ion responsive membrane, a hollow insulating extension therefrom, a highly insulated cable having a conductor electrically connected to said hydrogen ion responsive membrane through said extension and provided with an electrostatic shield insulated from said conductor, said cable including said shield extending from a point within said extension adjacent said membrane to a point a substantial distance from the end of said extension remote from said membrane, said insulation of said cable being composed of rubber and said electrostatic shield being embedded in said rubber insulation.

8. In a device for the electrical determination of pH, a glass electrode having a hydrogen ion responsive membrane, a hollow insulating extension therefrom, a highly insulated cable having a conductor electrically connected to said hydrogen ion responsive membrane through said extension and provided with an electrostatic shield insulated from said conductor, said cable including said shield extending from a point within said extension adjacent said membrane to a point a substantial distance from the end of said extension remote from said membrane, said insulation of said cable being composed of rubber and said electrostatic shield being embedded in said rubber insulation, and a moisture impervious insulating material between the extension of said electrode and said rubber insulation.

9. In a device for the electrical determination of pH, a glass electrode having a hydrogen ion responsive membrane, a hollow insulating extension therefrom, a plug having a ground fit with said glass electrode at the junction between the hydrogen ion responsive membrane and said insulating extension, a highly insulated cable having a conductor electrically connected to said hydrogen ion responsive membrane through said extension and provided with an electrostatic shield insulated from said conductor, said cable including said shield extending from a point within said extension adjacent said membrane to a point a substantial distance from the end of said extension remote from said membrane.

HENRY H. CARY.
WARREN P. BAXTER.